2,948,318
DETACHABLE TIRE TREAD

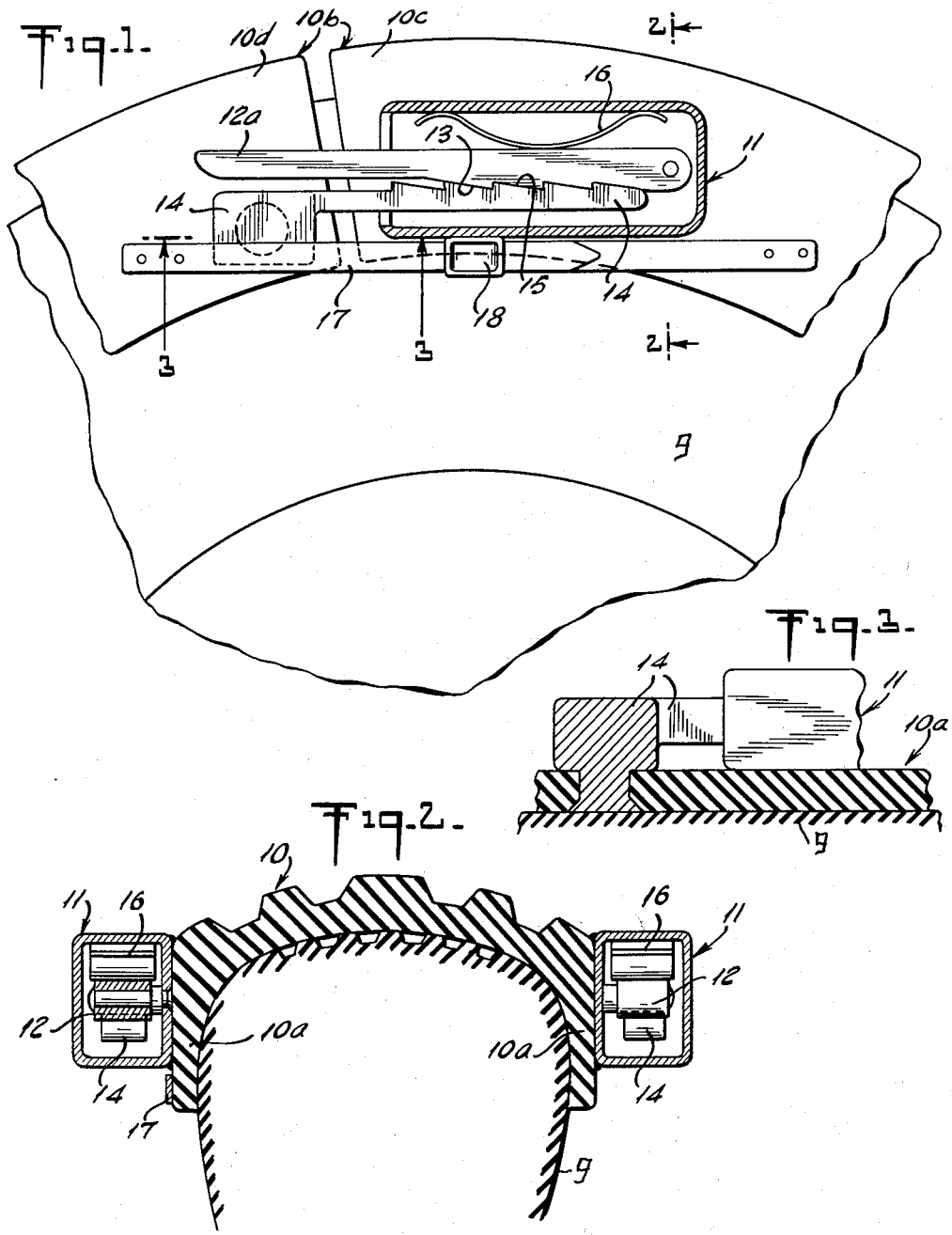

Tibor A. Firestone, Forest Hills, N.Y.
(1270 5th Ave., New York 29, N.Y.)

Filed June 9, 1958, Ser. No. 740,862

4 Claims. (Cl. 152—175)

This invention relates to a special tread which may be attached to an automobile tire in time of emergency to meet the special conditions, such as the encounter of snow and ice, or mud, and more particularly, this invention relates to the manner in which such a special tread is readily applied to the tire when the emergency comes, and readily detached when the emergency is over.

It is a further object to provide a closure mechanism for such a tread which may be easily clamped in place tight enough to stay on the tire, and which will be tightened automatically to a running position by the actual running of the tire itself with the tread in place.

In the drawings, the numeral 9 represents an automobile tire of any suitable construction, and the numeral 10 represents the shoe which is of a size to enclose the tire. This shoe has on its outer surface a tread suitable for engaging either snow or ice or mud, and it is so shaped as to enclose the outer surface of the tire and to extend down out somewhat over the sides as shown at 10a. This shoe is cut at 10b to assist in applying it to the tire, providing two ends 10c and 10d. On the end 10c there is provided on each side of the tire a box-like socket 11 having a lever 12 pivoted to one end thereof, and having its other end 12a extend out beyond the member 11 and beyond the end of the end 10c of the tread.

This lever 12 has ratchet teeth 13 thereon.

The other end of the shoe 10d has rigidly attached to it a prong 14 positioned to enter the box 11 when the shoe is in position on the tire, and having teeth 15 upon its upper surface in position to meet with and lock against the teeth 13 upon the lever 12. The teeth are so set that the prong may be pushed into the box but cannot be withdrawn without lifting lever 12. A spring 16 within the box 11 bears downwardly against the lever 12, so that, as the prong 13 is inserted in the box, the teeth 15 will slide over the teeth 13 while it is being pushed inwardly, and then will lock against removal.

A strap 17, having a take up buckle 18, may be attached to the two ends of the shoe, so that during the attaching process the shoe may be held in place by the strap while the locking mechanism is engaged, and forced to running position by the movement of the wheel.

In attaching the device to the car, the end 10c of the shoe may be laid on the ground and the tire backed over it, as the shoe is carried around the tire. As soon as the attaching mechanism has gone around the tire far enough to be accessible the strap 18 may be closed to hold it in place. The prong 14 is then inserted into the box 11, and as it is pushed in, the teeth 13 engage the teeth 15 to hold the shoe loosely in place, and then the strap 17 may be tightened. The hand tightening of the shoe, however, is inadequate for driving, but by nature of the attaching device the actual driving of the car will force the two ends closer together, and thereby cause the teeth 13 and 15 to slide upon each other to take up all lost motion until the shoe is tight upon the tire. With this construction it will be seen that the shoe may be easily applied and that the driving of the car itself provides the tension which holds it tightly in place.

When it is desired to remove the shoe all that is necessary is to unbuckle the strap 17 and then pry up the lever 12a to disengage the teeth 13 and 15, whereupon the shoe will become disengaged and may be easily removed.

With this construction it will be clear that the application of the device to a car is very simple, and that the actual bringing of the shoe into sufficiently tight engagement with the tire for driving is accomplished by the movement of the tire itself.

What is claimed:
1. A deteachable shoe for tires comprising a casing having a special tread surface adapted to embrace the tread of a tire and extend downwardly upon the sides thereof, being severed at one point to provide two ends to facilitate application to a tire, a ratchet arm extending rigidly out from one end of said shoe, and a socket member rigidly attached to the other end of said shoe having an opening in alignment with said ratchet arm, and releasable means within said socket member for engaging said ratchet arm to hold the shoe in place.

2. A detachable shoe for tires comprising a casing having a special tread surface adapted to embrace the tread of a tire and extend downwardly upon the sides thereof, being severed at one point to provide mating ends to facilitate application to a tire, a ratchet rod attached firmly to one end of said shoe and extending out beyond said end, a socket member firmly attached to the other end of said shoe, having an opening in alignment with said ratchet rod, a ratchet arm pivoted within said socket member having teeth positioned to engage the teeth of said ratchet rod when the latter is inserted in said socket, and spring means for urging said ratchet arm into engagement with said ratchet rod.

3. A detachable shoe for tires comprising a casing having a special tread surface adapted to embrace the tread of a tire and extend downwardly upon the sides thereof, being severed at one point to provide mating ends to facilitate application to a tire, a ratchet rod attached firmly to one end of said shoe and extending out beyond said end, a socket member firmly attached to the other end of said shoe, having an opening in alignment with said ratchet rod, a ratchet arm pivoted within said socket member having teeth positioned to engage the teeth of said ratchet rod when the latter is inserted in said socket, and spring means for urging said ratchet arm into engagement with said ratchet rod, said ratchet arm having a handle extending out of said socket member to facilitate manipulation.

4. A device according to claim 2 having detachable means for holding the ends of said casing together when first applied.

References Cited in the file of this patent

UNITED STATES PATENTS

| 1,021,272 | Shirk | Mar. 26, 1912 |
|---|---|---|
| 1,026,817 | McCrone | May 21, 1912 |
| 1,450,199 | Barber | Aug. 3, 1923 |
| 2,079,235 | Wettlaufer | May 4, 1937 |
| 2,505,724 | Robbins | Apr. 24, 1950 |
| 2,856,979 | Branch | Oct. 21, 1958 |